(12) United States Patent
Tzou

(10) Patent No.: US 8,114,508 B2
(45) Date of Patent: Feb. 14, 2012

(54) COMPOSITION OF MODIFIED MALEIC ANHYDRIDE AND EPDXY RESIN

(75) Inventor: Ming Jen Tzou, Taipei County (TW)

(73) Assignee: Nan Ya Plastics Corporation, Taipei (TW)

( * ) Notice: Subject to any disclaimer, the term of this patent is extended or adjusted under 35 U.S.C. 154(b) by 185 days.

(21) Appl. No.: 12/582,012

(22) Filed: Oct. 20, 2009

(65) Prior Publication Data

US 2011/0092640 A1 Apr. 21, 2011

(51) Int. Cl.
- B32B 27/04 (2006.01)
- B32B 27/28 (2006.01)
- B32B 27/38 (2006.01)
- C08L 25/04 (2006.01)
- C08L 63/00 (2006.01)
- C08G 59/40 (2006.01)

(52) U.S. Cl. ............ 428/297.4; 428/413; 523/457; 523/466; 525/529; 525/530; 525/531; 525/533

(58) Field of Classification Search ............ 428/297.4, 428/413; 523/400, 457, 466; 525/529, 530, 525/531, 533

See application file for complete search history.

(56) References Cited

U.S. PATENT DOCUMENTS

| 3,936,575 | A | * | 2/1976 | Watanabe et al. | 428/417 |
| 5,376,704 | A | * | 12/1994 | Barsotti | 523/414 |
| 6,509,414 | B2 | * | 1/2003 | Tikart et al. | 525/115 |

* cited by examiner

*Primary Examiner* — Michael J Feely
(74) *Attorney, Agent, or Firm* — Ming Chow; Sinorica, LLC

(57) ABSTRACT

The present invention provides a composition of the modified maleic anhydride and the epoxy resins, including (A) one or more of the epoxy resin mixtures, (B) a modified maleic anhydride copolymer, (C) additives and (D) inorganic filler materials, wherein component (A) the epoxy resin mixture accounts for 35%~56% by weight of the composition solids, component (B) the modified maleic anhydride copolymer accounts for 44%~65% by weight of the composition solids, based on 100% by weight of total components (A), (B) and (C). According to the present invention, the modified maleic anhydride copolymer curing agent is prepared by reacting styrene/maleic anhydride copolymer with a modifier having hydroxy groups (OH), wherein the modifier having hydroxy groups (OH) can be a brominated, phosphorus-based or halogen-free material; the epoxy resin composition of the present invention shows good heat resistance and outstanding electrical properties, is suitable for the production of prepreg material, bonding films and copper clad laminates, thus can be used in the field of the general or high-frequency printed circuit boards.

9 Claims, No Drawings

COMPOSITION OF MODIFIED MALEIC ANHYDRIDE AND EPDXY RESIN

FIELD OF THE INVENTION

The present invention relates to an epoxy resin composition with high glass transition temperature, superior thermal resistance and excellent electric properties, which is suitable for preparing prepreg, aminate and copper clad laminate (CCL), can be applied to electronic components and printed circuit boards in the high frequency field, or used as carrier substrate materials for package.

BACKGROUND OF THE INVENTION

Epoxy resin has been used in copper clad laminates and printed circuit boards for many years, the main reason thereof is that the adhesion strengths between epoxy resin and reinforcing materials such as glass fiber cloths, glass fiber mats and paper etc. are good, no volatile component is emitted during curing, and shrinkage is less during molding; the resulted copper clad laminate possesses superior mechanical strength, electric insulation, chemical resistance, good dimension accuracy and easy to be processed, thus it becomes a most important raw material for printed circuit boards.

At the moment, the copper clad laminate (CCL) used in printed circuit boards is mainly FR-4 based on not only quantity but also technical level, but the development of the electronics industry is advanced rapidly by leaps and bounds, the important related components—printed circuit boards should also keep up with the pace of time.

As for system products, light, thin, short, small, power saving and durable are the trend, nevertheless the size of the corresponding electronic components becomes smaller at continuously elevated operating frequency, decreased voltage, reduced transistor power consumption and less tolerate voltage noise, thus it is resulted the emerging one by one of the problems which are originally are not necessary to be considered in the low-frequency area; only in terms of printed circuit boards of the interconnection industry, two major development trends has already been generated; firstly the high density printed circuit board: the main technologies are fine circuits, small holes, blind holes, buried holes; secondly high-frequency electronic component carrier substrates and printed circuit boards for high-speed electronics: the main technologies include low dielectric constant, low dissipation factor for board materials and thin medium layer materials and the precision impedance control, etc.

21st century will become a video generation, the high-frequency high-speed application is one important trend of development of the future high-speed printed circuit board (PCB), the traditional FR-4 substrate can still meet the most current printed circuit board industry demand, and holds the largest market share; however, with increasing demand in the material properties and cost considerations, the standard FR-4 substrate can meet the demand of generic products, but as for the high frequency transmission products, the substrate materials are requested to have higher qualities, thus the low dielectric constant, low dissipation factor substrate just complies with the information products to meet the requirements of high-speed and high-frequency and coordinates the communication products for the massive and rapid transmission of voice and video data.

The copper clad laminate (CCL) material is mainly formed by a reinforcing material and a resin composition, the outer layer thereof is pasted together with copper foils, so the resin composition will be one of the main factors to impact electric properties of the substrate. The present patent describes the development of the resin composition to achieve the effectiveness of improving electric properties of substrate boards.

In patent BE-627887, it is mentioned that the copolymer of maleic anhydride and styrene is used as the curing agent of the epoxy resin, but the disadvantages of this epoxy resin composition are low glass transition temperature (Tg) and poor heat resistance so that it is not suitable for the application of copper clad laminates (CCL) and printed circuit boards (PCB) manufacturing.

When anhydride-type curing agent (hardener) is used with the epoxy resin, it will react rapidly at room temperature upon the addition of an accelerator (promoter), thus this is not suitable to be used in the field of printed circuit boards.

The resin system currently used for copper clad laminates and printed circuit boards is epoxy resin, and generally the standard FR4 substrate is used, whose main ingredient is bisphenol-A epoxy resin or brominated epoxy resin manufactured from tetrabromobisphenol-A wherein the curing agent is dicyandiamide, besides an accelerator and solvents are added; the disadvantages of the epoxy resin composition are a low glass transition temperature (Tg) (120-140) and poor heat resistance, if the multi-functional epoxy resin is used to replace bisphenol-A epoxy resin to elevate crosslinking density and thereby eliminate the disadvantage of the low glass transition temperature (Tg), but it is without much contribution to improve the heat resistance and electrical properties.

U.S. Pat. No. 6,509,414 reveals the use of styrene-maleic anhydride copolymer (SMA) as a resin curing agent, which can improve the heat resistance of a general difunctional epoxy resin; besides, a co-crosslinking agent is used, for example, styrene-maleic anhydride copolymer (SMA) is used with co-crosslinking agent, such as tetrabromobisphenol-A, tetrabromo-bisphenol-A diglycidyl ether (TBBADGE), to improve the glass transition temperature (Tg) of base materials; wherein the equivalent proportion of acid anhydride, aromatic hydroxy group(OH) and epoxy resin is 50%~150% in the mixed resin. Revealed by the examples, it is clearly understood that if the equivalent proportion is increased from 70% to 110%, then the DSC glass transition temperature (Tg) is elevated from 122 to 155, but if the equivalent proportion is further increased from 110% to 150%, the DSC glass transition temperature (Tg) drops to 137 from 155. This phenomenon is advised that when the equivalent proportion is more than around 110%, the crosslinking agent will no longer be able to enhance the crosslinking density, so that the DSC glass transition temperature (Tg) cannot be raised.

Nowadays copper clad laminate (CCL) and printed circuit boards (PCB) manufacturing trends from the halogen system (mainly brominated flame retardant agent TBBA) towards a non-brominated (mainly phosphorus based flame retardant agent) or even a halogen-free system; the modified maleic anhydride copolymer curing agent synthesis of the present invention is in response to the future environmental protection demand, the present system may be a halogen system, a phosphorus system or a halogen-free system.

DETAILED DESCRIPTION OF THE INVENTION

The present invention is to reveal a composition containing a modified maleic anhydride and epoxy resins, particularly the composition includes one or more of the epoxy resin mixture, the modified maleic anhydride copolymer curing agent, additives and inorganic fillers, wherein the epoxy resin mixture accounts for 35%~56% by weight, the modified maleic anhydride copolymer accounts for 44%~65% by weight, based on the total solid weight of the epoxy resin mixtures, the modified maleic anhydride copolymer and additives as 100%.

The present invention discloses that the reaction of the styrene-maleic anhydride copolymer with a modifier having hydroxy group(OH) leads to a modified maleic anhydride copolymer curing agent; wherein the modifier having hydroxy group(OH) can be bromine-, phosphorus- or halogen-free based substances; the epoxy resin composition of the present invention exhibits good heat resistance and outstanding electrical properties, is suitable for the production of prepreg materials, bonding films, copper clad laminates, can be used in the general or high-frequency fields of printed circuit boards.

DESCRIPTION OF THE PREFERRED EMBODIMENT

The present invention provides the use of a synthetic way to produce a new type of a modified maleic anhydride copolymer-based curing agent, and the use of this new type curing agent matched with an appropriate epoxy resin and a promoter to obtain a resin composition, thus the resulted composition can be applied to the copper clad laminate (CCL) and printed circuit board (PCB) manufacturing.

The described resin composition includes one or more of the epoxy resin mixture, accounting for 35%~56% by weight of the composition solids, the modified maleic anhydride copolymer, accounting for 44%~65% by weight of the composition solids, additives, and inorganic fillers accounting for 0%~30% by weight of the composition.

The epoxy resin used in the said resin mixtures can a single functional or difunctional epoxy resin, having an epoxy equivalent of 150~3000 g/eq, and selected from bisphenol-A epoxy, bisphenol-F epoxy. To increase the glass transition temperature and heat resistance, a multi-functional epoxy resin having an epoxy equivalent of 150~3000 g/eq is used, i.e. a phenolic-formaldehyde novolac type resin is selected. To elevate flame retardance, brominated epoxy resin, phosphorus based epoxy resin or nitrogen based epoxy resin having an epoxy equivalent of 150-3000 g/eq is chosen. Epoxy resin with a heterocyclic structure, such as dicyclophentadiene (DCPD) epoxy resin, can be also used, the research discovers that the incorporation of a dicyclophentadiene (DCPD) type epoxy resin can markedly improve electric properties and water absorption.

Moreover, to enhance electrical characteristics, a cyanate ester resin having a structure as follows can be added, for example, cyanate ester resin having cyanate equivalent weight of 235 g/eq, known as BA230S trade name produced by Lonza, is introduced to obviously elevate the glass transition temperature, electric properties and peel strength.

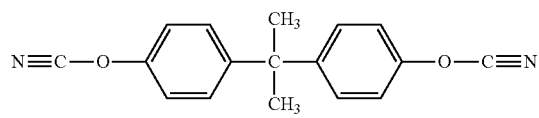

The selection of the said epoxy resin mixture depends on the processability, physical properties; thereby one or more of the above-mentioned resins can be chosen and used.

The structure of the aforementioned modified maleic anhydride copolymer-based curing agent can be a copolymer in Synthesis Example A, B, C or D. The synthesis process of the invented polymers is as follows:

Polymer Synthesis

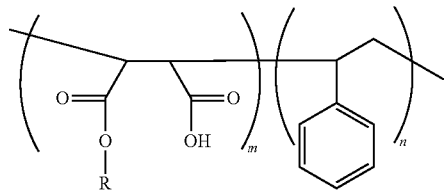

m, n are the same or different positive integers

SYNTHESIS EXAMPLE 1

Synthesis of a Halogen Based Modification Type Maleic Anhydride Copolymer Curing Agent 410 grams of styrene-maleic anhydride copolymer resin and 543.6 grams of tetrabromobisphenol-A are put into a three neck reaction flask, and dissolved in 1000 grams of toluene at room temperature, 0.5 grams of BDMA (benzyl dimethyl amine) is added and stirred for 30 minutes, and then warmed to 70~80 to carry out the reaction for 3~4 hours, the copolymer A of tetrabromobisphenol-A modified maleic anhydride and styrene is resulted, which has the structure as follows:

R in copolymer A:

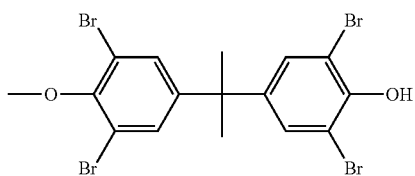

SYNTHESIS EXAMPLE 2

Synthesis of a Non-Halogen Based Modification Type Maleic Anhydride Copolymer Curing Agent 410 grams of styrene-maleic anhydride copolymer resin and 228 grams of bisphenol-A are placed into a three neck reaction flask, and dissolved in 1000 grams of toluene at room temperature, 0.5 grams of BDMA (benzyl dimethyl amine) is added and stirred for 30 minutes, then warmed to 70~80 to carry out the reaction for 3~4 hours, the copolymer B of bisphenol-A modified maleic anhydride and styrene is resulted, which has the structure as follows:

R in copolymer B:

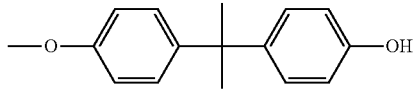

SYNTHESIS EXAMPLE 3

Synthesis of a Phosphorus Based Modification Type Maleic Anhydride Copolymer Curing Agent 410 grams of styrene-maleic anhydride copolymer resin and 324 grams of DOPO-HQ are placed into a three neck reaction flask, and dissolved in 1000 grams of toluene at room temperature, 0.5 grams of BDMA (benzyl dimethyl amine) is added and stirred for 30 minutes, then warmed to 70~80 to carry out the reaction for 3~4 hours, a DOPO-HQ modified maleic anhydride-styrene copolymer C having the structure as follows is produced:

R in copolymer C:

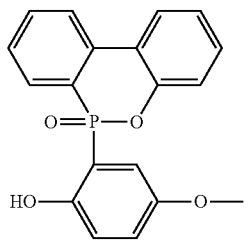

SYNTHESIS EXAMPLE 4

Synthesis of a Phosphorus Based Modification Type Maleic Anhydride Copolymer Curing Agent 410 grams of styrene-maleic anhydride copolymer resin and 90 grams of PMP are put into a neck reaction flask, and dissolved in 1000 grams of toluene at room temperature, 0.5 grams of BDMA (benzyl dimethyl amine) is added and mixed for 30 minutes, then warmed to 70~80 to conduct the reaction for 3~4 hours, a PMP modified styrene-maleic anhydride copolymer D is achieved:

R in copolymer D:

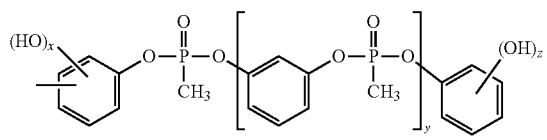

wherein x is 0-4, y is 0 or a positive integer, and z is 0-5.

The choice of the said modified maleic anhydride copolymer-based curing agent depends on the resin composition, and can be a halogen system, or in response to the trend of environmental protection, non-halogen and phosphorus systems are selected.

Depending on the desired characteristics of the cured resin composition, the aforementioned additives are used to improve or enhance processability, mechanical properties and base material physical properties. The said additives can be a high molecular weight phenoxy resin, rubber or flame retardant agents. For example, INCHEMREZ PKHS (high molecular weight phenoxy resin) can be added to improve toughness and impact strength of the composition formulation; Hycar® CTBN 1300×8 rubber can be incorporated to improve the adhesion strength with copper foil; PX200 flame retardant agent of DAIHACHI CHEMICAL INDUSTRY CO. can be introduced to enhance the flame retardance of the base material.

Inorganic fillers are added for the purpose of upgrading rigidity, lowering thermal expansion coefficient or increasing the flame retardance of the cured resin composition of the present invention. The aforementioned inorganic fillers can be a crystalline-type, the ball-type or fused-type silica, aluminum hydroxide, magnesium hydroxide, aluminum oxide, alone or the mixture thereof For example, silica can be used to reduce the thermal expansion coefficient of the cured materials; magnesium hydroxide, aluminum oxide can be added to enhance the flame retardance; alumina can be incorporated for improving the thermal conductivity and so on.

The purpose of the present invention is to provide an affordable thermosetting resin composition including the new modified maleic anhydride and epoxy resins, the composition can be completely dissolved in a solvent at ambient temperature and resulted in a stable homogeneous varnish, which can be used in the manufacture of prepreg, copper clad laminate (CCL) for the application of printed circuit boards.

The mentioned prepreg is prepared from the resin composition of the present invention, wherein the resin composition is formulated into a varnish, and a reinforcing material is impregnated in the epoxy resin composition, then the impregnated material is put in an oven for solvent evaporation and simultaneously the resin composition is partially reacted to become a semi-cured prepreg (B-stage).

The reinforcing materials can be glass fiber, carbon fiber, Kelvar fiber, paper fiber, such as aromatic polyamide paper, etc.; the prepreg can be laminated further to obtain a copper foil substrate, and one or more prepreg can be so brought together that its upper and lower sides are copper foils, then the composition is heated and pressurized, finally resulted in a copper clad laminate composite.

The cured resin composition of the present invention exhibits high glass transition temperature (Tg), excellent heat resistance and excellent electrical characteristics can be applied to the general or high-frequency fields of printed circuit boards. The implementation of the present invention will refer to the following examples for further details.

EXAMPLE 1

60 grams of a multi-functional resin (NPCN-704 of NanYa Corporation) is pre-dissolved in methyl ethyl ketone (MEK) to form a 70% solution, and then mixed with 50.6 grams of the bifunctional tetrabromobisphenol-A diglycidyl ether (NanYa Corporation's NPEB-454A80), thereafter 118.7 grams of the halogen modified maleic anhydride copolymer A (such as shown in Synthesis Example 1, pre-dissolved in MEK to become a 60% solution) and 0.04 grams of the accelerator (2MI) are added in this resulted solution respectively, the equivalent proportion of the modified maleic anhydride copolymer A and the epoxy resin is 67%, based on the overall solid resin content.

The resin composition is stirred for 3 hours, and a gel time about 270 seconds at 170; this solution is poured into an impregnation tank wherein glass fiber cloth (model 7628) is continuously impregnated, then passed through a heating oven to evaporate solvent and the resin composition undergoes a partial reaction at the same time to get a semi-cured prepreg (B-stage), thereafter taken out from the oven, cooled to room temperature, and the resulted semi-cured prepreg is cut into sheets; top and bottom of 8 semi-cured thin sheets are sandwich-laminated with copper foils, (specification 1 oz), then a hot press with a heating rate of 2.5/min to 180 sustained for 60-120 minutes, a pressure of 20-30kg/cm², is used to laminate the resin composition to continue the reaction to achieve the hardening completion (C-stage), the physical properties tests show 177 glass transition temperature (Tg) and excellent heat resistance and so on. The physical properties test data are presented in Table 2.

EXAMPLE 2

The resin composition proportion is the same as Example 1, except that additional 10% of an inorganic filler—silica is charged, wherein the percentage is based on the overall resin solid content, then the resin composition is cured in accordance with the aforementioned manufacturing method, the physical properties tested show a favorable lower coefficient of thermal expansion besides the original characteristics. The physical properties test data are presented in Table 2.

EXAMPLE 3

125 grams of resin solution (Nan Ya Corporation's NPEB-426A80) is taken, wherein 79.2 grams of the halogen modified maleic anhydride copolymer A [such as shown in Synthesis Example 1, pre-dissolved in methyl ethyl ketone (MEK) to form a 60% solution] and 0.03 grams of the accelerator 2MI are added respectively, then 20 grams of the inorganic filler—silica is introduced, the equivalent proportion of the modified maleic anhydride copolymer A and the epoxy resin accounts for 65%, based on the overall resin solid content (not including the inorganic filler material). In accordance with the manufacturing method of Example 1, physical properties tested prove to have Tg of 160 and excellent heat resistance and so on. The physical properties test data are presented in Table 2.

EXAMPLE 4

126.6 grams of a multi-functional resin solution (Nan Ya Corporation's NPEB-487A80) is used, wherein 90.9 grams of the non-halogen modified maleic anhydride copolymer type B [such as the aforementioned Synthesis Example 2, pre-dissolved in methyl ethyl ketone (MEK) to form a 60% solution] and 0.04 grams of the accelerator 2MI are added respectively, then 21.5 grams of the inorganic filler—silica is charged, wherein the equivalent proportion of the modified B-type maleic anhydride copolymer and the epoxy resin accounts for 110%. In accordance with the manufacturing method of Example 1, physical properties tested prove to have Tg of 185 and excellent heat resistance and so on. The physical properties test data are presented in Table 2.

EXAMPLE 5

To the solution of 57.1 grams phosphorus-based multi-functional epoxy resin (Nan Ya Corporation's NPEP-200LA70), and 85.7 grams multi-functional resin (Nan Ya Corporation's NPPN-438A70), 184.5 grams of the phosphorus modified maleic anhydride copolymer C [such as Synthesis Example 3, pre-dissolved in methyl ethyl ketone (MEK) to form a 60% solution] and 0.04 grams of the accelerator 2MI are added respectively, then 31.6 grams of the inorganic filler—silica is introduced, wherein the equivalent proportion of the modified maleic anhydride copolymer C and the epoxy resins accounts for 120%. In accordance with the manufacturing method of Example 1, the physical properties of the halogen-free material tested prove to have Tg of 155 and excellent heat resistance and so on. The physical properties test data are presented in Table 2.

EXAMPLE 6

To the solution of 57.1 grams phosphorus-based multi-functional epoxy resin (Nan Ya Corporation's NPEP-200LA70), 73.6 grams multi-functional groups resin (Nan Ya Corporation's NPPN-438A70), and 8.5 grams rubber (Hycar® CTBN 1300×8), 165.6 grams of the phosphorus modified maleic anhydride copolymer C [such as Synthesis Example 3, pre-dissolved in methyl ethyl ketone (MEK) to form a 60% solution] and 0.04 grams of the accelerator 2MI are added respectively, then 31.6 grams of the inorganic filler—silica is introduced, wherein the equivalent proportion of the modified C-based maleic anhydride copolymer and the epoxy resins accounts for 120 percent. In accordance with the manufacturing method of Example 1, the physical properties test data are presented in Table 2.

COMPARATIVE EXAMPLE 1

100 grams of a brominated epoxy resin manufactured from bisphenol-A epoxy resin and tetrabromobisphenol-A as the main ingredient of the resin and dicyandiamide as a curing agent are pre-dissolved in N,N-dimethyl formamide (DMF), the equivalent proportion of the epoxy resin and the curing agent accounts for 50%, based on the overall resin solid content, then the accelerator 2MI is introduced, and the solvent methyl ethyl ketone (MEK) is used to adjust the solid content of the resin composition to be 65%. In accordance with the manufacturing method of Example 1, the physical properties test shows Tg 140 and heat resistance at 288 solder bath for 2-3 minutes. The physical properties test data are presented in Table 2.

COMPARATIVE EXAMPLE 2

Based on Comparative Example 1, the brominated epoxy resin manufactured from bisphenol-A epoxy resin and tetrabromobisphenol-A is replaced by a multi-functional brominated epoxy resin made from a multi-functional resin and tetrabromobisphenol-A. In accordance with the manufacturing method of Example 1, the physical properties test shows Tg 170 and heat resistance at 288 solder bath for 2-3 minutes. The physical properties test data are presented in Table 2.

TABLE 1

Resin Composition Equivalent Proportions of Examples and Comparative Examples

| | Examples | | | | | | Comparative Examples | |
|---|---|---|---|---|---|---|---|---|
| | 1 | 2 | 3 | 4 | 5 | 6 | 1 | 2 |
| equivalent proportion (%) | 67 | 67 | 65 | 110 | 120 | 120 | 50 | 50 |

TABLE 2

| | Example 1 | Example 2 | Example 3 | Example 4 | Example 5 | Example 6 | Comparative Example 1 | Comparative Example 2 |
|---|---|---|---|---|---|---|---|---|
| Glass transition temperature (DSC) | 177 | 177 | 160 | 185 | 157 | 155 | 140 | 170 |
| Peel strength of copper foil, lb/in | 7.5 | 7.5 | 8.5 | 7.7 | 6.6 | 7.6 | 12 | 10 |
| Solder heat resistance test (288), min | >10 | >10 | >10 | >10 | >10 | >10 | 2-3 | 2-3 |
| Decomposition temperature (Td) | 363 | 362 | 361 | 366 | 364 | 363 | 310 | 315 |
| Time to De-lamination T-288 (TMA), min | >40 | >40 | >40 | >40 | >40 | >40 | 2~3 | 2~3 |
| CTE, ppm/ | 285 | 250 | — | — | — | — | — | — |
| Dielectric constant (1 GHz) | 3.95 | 3.96 | 3.88 | 3.93 | 4 | 4 | 4.6 | 4.3 |
| Dissipation factor (1 GHz) | 0.011 | 0.011 | 0.01 | 0.011 | 0.012 | 0.012 | 0.025 | 0.015 |

The present invention composition of the modified maleic anhydride and the epoxy resin is used to manufacture copper clad laminate (CCL), which is tested according to IPC-TM650 for glass transition temperature (Tg), copper peel strength, thermal decomposition temperature (Td), time to de-lamination by TMA (T288), solder heat resistance (288), dielectric constant (Dk), dissipation factor (Df) etc. The physical properties test results indicate that the invention composition of the modified maleic anhydride and the epoxy resin shows a high glass transition temperature (Tg), excellent heat-resistant properties and excellent electrical properties, thus is suitable for the production of the substrate material of electronic components and printed circuit boards.

The present invention provides the composition of the modified maleic anhydride and the epoxy resin, which possesses:
1. High glass transition temperature (Tg): suitable for the application of high-level printed circuit boards or substrate boards;
2. Superior heat-resistance properties: solder heat resistance test more than 10 minutes, no de-lamination situation; time to de-lamination at 288 by TMA more than 40 minutes;
3. Outstanding thermal properties: thermal decomposition temperature (Td) greater than 350, can meet lead-free manufacturing process requirements;
4. Excellent electrical properties: thereby the signal transmission delay diminished and the signal distortion alleviated under the high-frequency circumstance.

In summary, the present invention composition of the modified maleic anhydride and the epoxy resin, with an equivalent ratio ranges from 0.6 to 1.4, shows good heat resistance and good electrical properties, suitable for the production of the prepreg material, bonding films, copper foil laminates, thus can be applied to the general or high-frequency fields of printed circuit boards.

What is claimed is:
1. A resin composition comprising:
(A) at least one epoxy resin,
(B) a modified maleic anhydride copolymer,
(C) optional additives, and
(D) inorganic filler materials, wherein the structure of the modified maleic anhydride copolymer (B) is as follows:

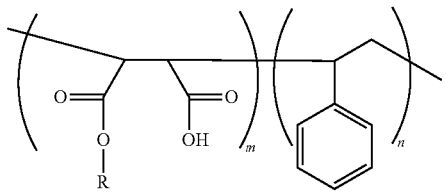

wherein m and n are positive integers, can be the same or different, and R is:

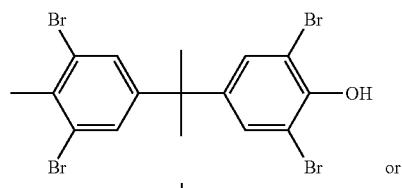

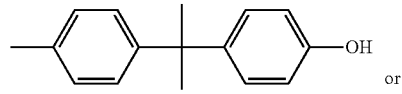

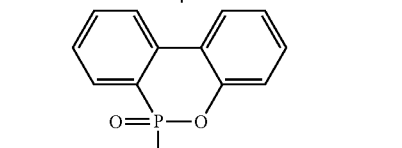

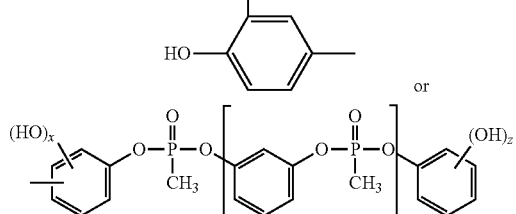

wherein x is 0-4, y is 0 or a positive integer, and z is 0-5.

2. The resin composition according to claim 1, wherein the at least one epoxy resin of component (A) is selected from the group consisting of: a BPF type epoxy resin having an epoxy equivalent of 150-3000 g/eq, a BPA type epoxy resin having an epoxy equivalent of 150-3000 g/eq, a multi-functional epoxy resin having an epoxy equivalent of 150-3000 g/eq, a heterocyclic epoxy resin, and combinations thereof; and wherein component (A) optionally further comprises a cyanate ester resin.

3. The resin composition according to claim 1, wherein component (A) accounts for 35%~56% by weight, based on the total combined solids of components (A), (B), and (C).

4. The resin composition according to claim 1, wherein component (B) accounts for 44%~65% by weight, based on the total combined solids of components (A), (B), and (C).

5. The resin composition according to claim 1, wherein component (C) is selected from the group consisting of: a high molecular weight phenoxy resin, a rubber, a flame retardant agent, and combinations thereof.

6. The resin composition according to claim 1, wherein component (D) is selected from the group consisting of: crystalline-type silica, ball-type silica, fused-type silica, aluminum hydroxide, magnesium hydroxide, alumina, and combinations thereof.

7. The resin composition according to claim 1, wherein the equivalent ratio of modified maleic anhydride copolymer to epoxy resin ranges from 0.6 to 1.4.

8. A prepreg material made by impregnating or coating a reinforcing material with the resin composition of claim 1.

9. A bonding film made by impregnating or coating a reinforcing material with the resin composition of claim 1.

* * * * *